Nov. 4, 1958     H. A. ROBINSON     2,859,165

CATHODIC PROTECTION APPARATUS

Filed May 23, 1956

INVENTOR.
Harold A. Robinson
BY
Griswold & Burdick
ATTORNEYS

United States Patent Office 2,859,165
Patented Nov. 4, 1958

2,859,165

CATHODIC PROTECTION APPARATUS

Harold A. Robinson, Midland, Mich., assignor to The Dow Chemical Company, Midland, Mich., a corporation of Delaware Application May 23, 1956, Serial No. 586,838

1 Claim. (Cl. 204—197)

This invention relates to apparatus for regulating the current flow in a cathodic protection circuit and particularly to apparatus in which the regulation of current occurs in a non-linear manner.

In the past it has been common practice to connect a resistive element of fixed value in series between a sacrificial anode and its cathode when the electrolyte in which the anode and cathode is placed is so highly electrically conductive that an abnormally large current would otherwise flow between the anode and cathode. Such resistive current limiting systems work well when the conductivity of the electrolyte (in which the anode and cathode are situated) remains high. The resistance value is chosen, for example, to limit current flow in the circuit to an amount which is sufficient for cathodic protection requirements, thereby lengthening the life of the anode.

A resistive current limiting arrangement of the above described type is less satisfactory than is desired when a fixed resistor is used in connection with the cathodic protection of buried pipe lines or other objects buried in the earth or other electrolytes which vary in electrical conductivity from time to time.

For example, in some pipe line installations the earth in which the metal pipe line is buried may be highly electrically conductive in the spring time or after heavy rains. The high electrical conductivity of the earth results in unduly rapid consumption of the sacrificial anodes placed along the line, due to excessive current flow over the amount required to adequately protect the line. On the other extreme, during dry summer months, for example, the electrical conductivity of the earth surrounding the pipe line may be so low that the current flow in the cathodic protection circuit may be quite small even though no external series resistance is in the circuit. Thus, if an external resistance were in the circuit, the current flow in the cathodic protection circuit during times when the earth is dry and highly resistive (low conductance conditions) would fall to perhaps negligible amounts. Under exceedingly dry conditions little current will flow in the circuit even though no series resistance is in the circuit. Thus, an external resistance in series with the anode and cathode of the protection circuit may be detrimental to the cathodic protection of the cathode during times when the electrolyte is highly resistive.

One good arrangement for assuring reasonable rates of consumption of anodes used in pipe line protection during the "wet season" would be the insertion of conventional external resistors of fixed value during the wet season and removal of the external resistors during those seasons in which the earth (electrolyte) is not unduly conductive. Such an arrangement, however, would be impractical and too expensive to operate in most cathodic protection installations.

Accordingly, a principal object of this invention is to provide an improved method of selectively regulating the current flow in a cathodic protection system.

Another object of this invention is to provide an improved sacrificial anode assembly which has incorporated therein means for selectively regulating the current flow capable of being drawn therefrom.

In accordance with this invention, a method of selectively regulating current flow in a cathodic protection system is achieved by incorporating a non-linear resistive impedance in the anode-cathode connecting circuit whereby as more current tends to be drawn the impedance increases and the current flow is limited.

An anode assembly is provided which includes a non-linear resistance which is sealed within the body of the anode whereby the impedance element is protected from damage during shipping, storage, installation, or use.

The invention, as well as additional objects and advantages thereof, will best be understood when the following detailed description is read in connection with the accompanying drawings, in which.

Figure 5:
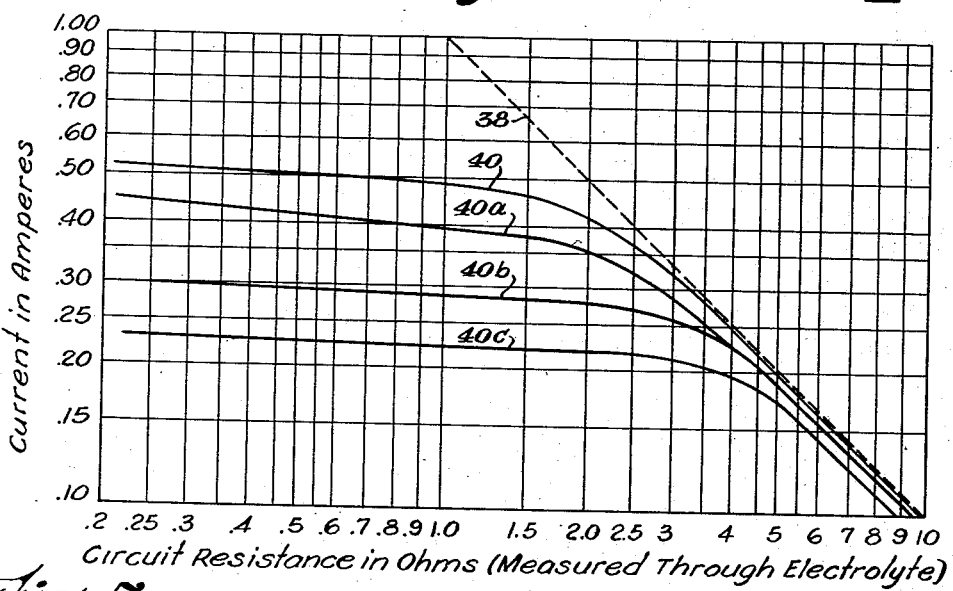
Figures 2, 3, 4:
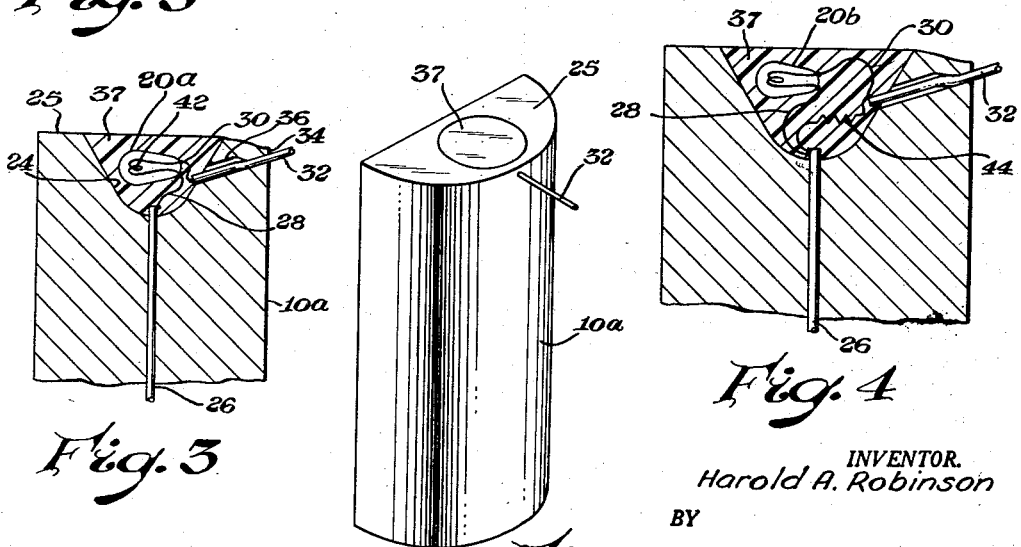
Fig. 2 is an elevational view of a sacrificial anode assembly incorporating a current limiting device in accordance with this invention.
Fig. 3 is a fragmentary sectional view of the anode shown in Fig. 2.

Fig. 4 is an enlarged fragmentary view, in section, of the upper end of the anode of the type shown in Fig. 3, and having a linear impedance connected in parallel with the nonlinear impedance, and Fig. 5 is a graph showing anode current as a function of conductivity of the electrolyte in which the anode and a cathode to be protected are embedded. Curves are plotted on the basis of both linear and non-linear impedance elements connected in series with the anode and cathode in a cathodic protection circuit.

Figure 1:
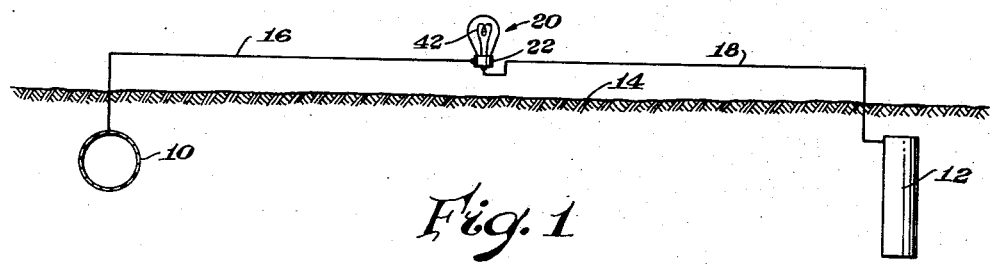
Fig. 1 shows, in diagrammatical form, a cathodic protection system incorporating current regulating or limiting means in accordance with this invention.

Referring to the drawing, Fig. 1 shows a cathodic protection circuit comprising a metallic cathode (pipe line) 10, of steel, for example, to be cathodically protected, a consumable anode 12, of magnesium, for example, each of which are embedded in an electrically conductive medium or electrolyte 14, such as earth. The anode 12 and cathode 10 are electrically connected by means of leads 16, 18 and a non-linear impedance element indicated generally by the numeral 20, which is connected in series with the anode 12 and cathode 10.

The non-linear impedance element 20 illustrated comprises a small electric light bulb (of the flash light type) having a tungsten filament which increases in resistance with an increase in its operating temperature. The conductors 16, 18 are, for the purpose of illustration, shown soldered to the terminal contacts of the bulb base 22, to secure a positive connection between the bulb 20 and the leads 16, 18.

In practice, the bulb 20 may be incorporated in an anode assembly as shown in Figs. 2 and 3. The anode 10a contains a hollowed-out section 24, seen in Fig. 3, in its upper end 25. The hollowed-out section may be the depression left as the anode metal cools after it is cast. The core rod 26 of the anode 10a extends into the hollowed-out section 24, and is connected to one lead 28 of the bulb 20a which is illustrated as a base-less bulb having thin leads 28, 30 extending through the press seal (not shown) of the bulb 20a. The lead 30 is connected to the anode lead wire 32 which passes from the outer edge 34 of the anode into the hollowed-out section 24 through a small bore 36 extending downwardly into the anode 10a from near the upper end 25. The hollowed-out section 26 is packed with a tar-like, fluid impervious electrically insulating material 37 which prevents moisture entering the section 24 and shorting out the non-linear impedance element 20a, thus destroying the effectiveness of the element 20a in a cathodic protection circuit in which it is used.

The bore 36, through which the lead wire 32 passes, is normally flattened somewhat, by a hammer blow on the upper part 25 of the anode 10a, to tightly hold the lead wire 32. Such a holding arrangement prevents damage to the thin lead 30 of the bulb 20a in event the lead wire 32 is pulled.

In Fig. 5, the effect of a non-linear impedance element 20 in a cathodic protection circuit is compared with a linear impedance element such as a fixed value resistor. On the graph the ordinate represents current flow in the cathodic protection circuit and the abscissa represents the resistance of the electrolyte in which an anode and cathode are embedded. The electrolyte resistance is measured between the anode and cathode when the anode and cathode are not electrically connected together through leads as in Fig. 1, for example. The dotted line 38 shows the current flow between a metallic cathode and a consumable anode embedded in an electrolyte with a fixed resistance element connected between the anode and cathode. It should be noted that the current flow in the cathodic protection circuit (which is of the type shown in Fig. 1 except a fixed resistor is substituted for the non-linear impedance element 20) increases at a uniform rate as the resistance of the electrolyte decreases.

The solid lines 40, 40a, 40b, 40c show current plotted against electrolyte resistance for a number of different tungsten filament bulbs 20. It may be seen that when the resistance of the electrolyte is high and the current passing through the bulbs is small and does not heat the filament 42 of the bulb 20 sufficiently to raise by a significant amount the electrical resistance of the bulb filament 42 (see Figs. 1 and 3). However, when the resistance of the electrolyte decreases, the heavier current flow through the bulb filament 42 heats the tungsten type filament and increases the filament resistance. The increase in resistance of the filament 42 thus serves to limit current flow through the cathodic protection circuit (within the current carrying capabilities of the filament of a particular bulb).

Referring again to Fig. 1, the operation of the cathodic protection circuit in dry weather when the earth is highly resistive is such that the filament 42 of the bulb 20 in the circuit is not heated enough to appreciably increase the "cold resistance" of the filament. Under such conditions of operation the bulb acts essentially as a fixed resistance of low value. When the electrolyte (earth) is quite damp and the electrical resistance (measured through the electrolyte) between anode and cathode is low, the extra current which passes through the bulb 20 heats the filament 42, thereby increasing the electrical resistance of the filament and regulating or limiting the current flow between the anode 12 and the cathode 10. It can be seen from the flattening of the curves 40—40c that after the electrolyte resistance decreases somewhat, the filament temperature increases and raises the filament resistance rapidly so that a further decrease in electrolyte resistance results in only a slight increase in current in the circuit.

Another anode assembly in accordance with this invention is shown in Fig. 4. The anode assembly of Fig. 4 is the same as the assembly of Fig. 3 except that a resistance 44 of fixed value is connected between the core 26 and the anode lead 32 in parallel with the bulb 20b. It is also within the teaching of this invention to provide a fixed resistance (not shown) in series with the bulb 20b in event the "cold" resistance of the bulb 20b is not high enough in value to be suitable for use in a particular electrolyte.

I claim:

A galvanic anode assembly comprising a galvanic anode body and having a core embedded therein and bonded thereto, said anode body having a depression therein, said depression communicaing with said core, a non-linear resistance element, said resistance element having a positive temperature cofficient of resistance and being disposed within an hermetically sealed envelope an anode lead, said non-linear resistance element being electrically connected between said core and said anode lead and disposed in said depression, said anode body having a bore therein which extends through said body and communicates with said depression, said anode lead extending through said bore and being held therein by friction holding means, the remainder of said depression being filled with a fluid-impervious, electrically non-conductive material.

References Cited in the file of this patent
UNITED STATES PATENTS

| | | |
|---|---|---|
| 2,204,823 | Rhodes | June 18, 1940 |
| 2,435,973 | MacTaggert | Feb. 17, 1948 |
| 2,486,871 | Osterheld | Nov. 1, 1949 |
| 2,568,594 | Robinson | Sept. 18, 1951 |
| 2,620,297 | Stobie et al. | Dec. 2, 1952 |
| 2,656,314 | Osterheld | Oct. 20, 1953 |
| 2,740,757 | Craver | Apr. 3, 1956 |